Patented Feb. 4, 1941

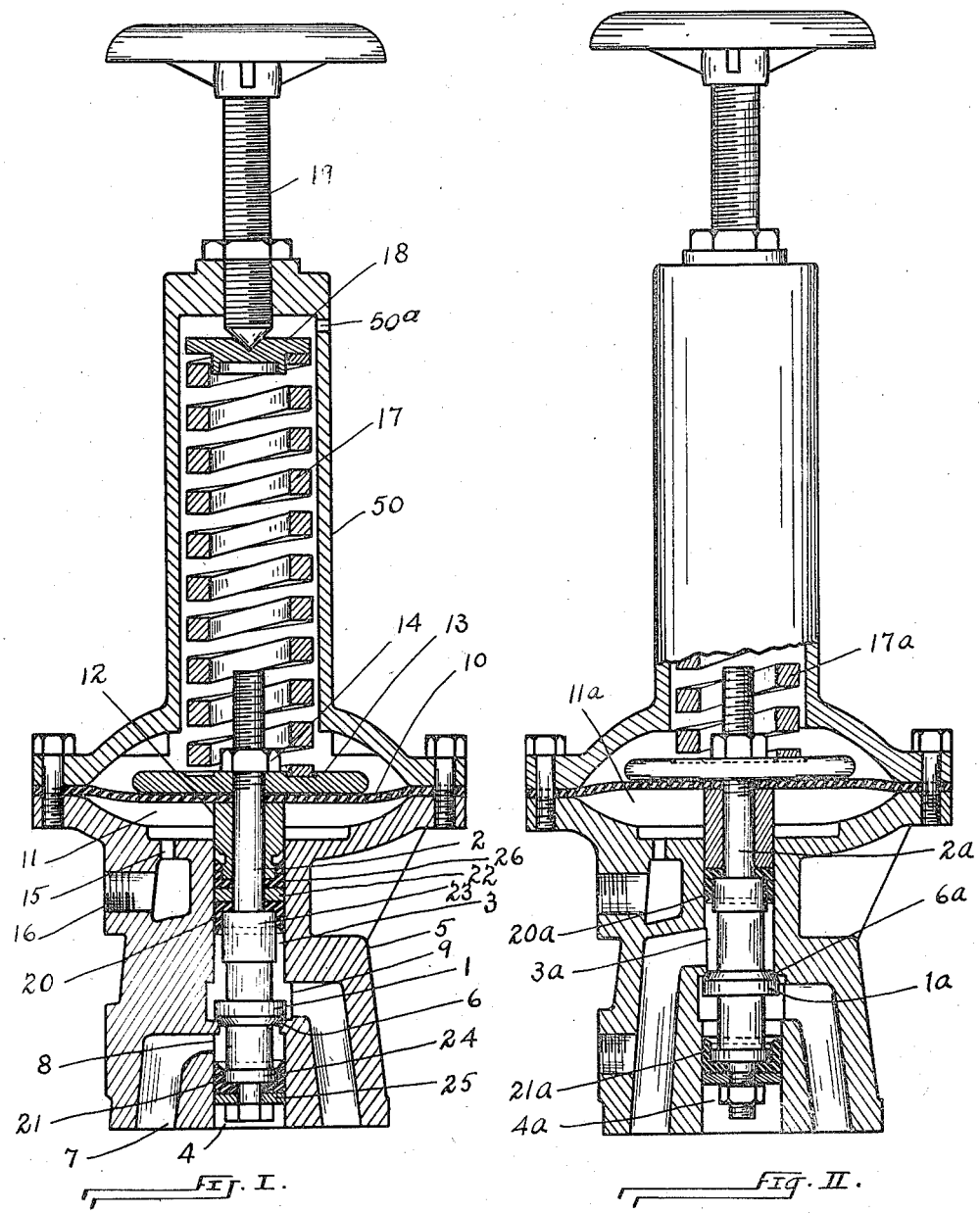

2,230,718

UNITED STATES PATENT OFFICE 2,230,718

VALVE

Thor Gannestad, Pittsburgh, Pa.

Application August 15, 1938, Serial No. 224,900

2 Claims. (Cl. 137—153)

My invention relates to valves, particularly though not exclusively to pilot valves for controlling the supply of operating fluid to the motors of large mechanically actuated valves, such as the automatic cone valves now widely used in water mains.

The invention consists in refinements and elaborations in structure, by virtue of which the valve is more accurately responsive to critical pressure values. The valve is of simplified and economical construction, and all movable parts of the structure are entirely enclosed and protected within a durable metal housing.

A valve embodying the invention is illustrated in the accompanying drawing, in which Fig. I is a view of the valve structure, partly in axial section and partly in side elevation; Fig. II is a view comparable in general with Fig. I, illustrating permissive modifications.

The structure of the invention includes a valve for controlling the flow of fluid between a point of supply and a point of delivery. The valve in its flow-controlling operation is responsive to variations in the pressure of the fluid either at the point of supply or at the point of delivery, and in some cases the valve may be responsive to variations in pressure conditions having no relation to the pressure of fluid whose flow is being controlled.

The valve of the structure is shown at 1 in the drawing. It is carried on a plunger 2 arranged in two axially aligned cylinders 3 and 4 within a body 5. Between the cylinders 3 and 4 a valve-seat 6 is provided, and when the plunger is axially shifted in one direction or the other, the valve 1 is moved either to or from position on its seat 6. In this case the cylinders 3 and 4 are of equal diameters, and it will be understood that these two cylinders (whether of equal diameters or not) may be considered a single cylinder with the valve-seat 6 provided intermediate its length. In the following specification and claims, I shall speak of these two cylinders as one. A passage 7 is formed in the body 5, and by means of suitable conduit (not shown) this passage is connected in the line of flow between a supply of fluid under pressure and a point of delivery—say at the inlet port of a valve-operating motor. The passage 7 includes an inlet 8 that opens into the cylinder 3, 4 beneath (or on one side of) the seat 6, and an outlet 9 that opens in the cylinder above (or on opposite side of) such seat. In known way a flexible diaphragm 10 is arranged to form a wall portion of a fluid-pressure chamber 11, and the body of the diaphragm is centrally secured to the plunger, between a sleeve 12 and a washer and nut 13, 14. Communication is established between the diaphragm chamber and the body of fluid whose pressure is to control flow through passage 7, and such communication is established through a port 15 and a conduit (not shown) extending from an opening 16. The pressure established and maintained in chamber 11 is effective over substantially the entire under surface of the diaphragm, and tends to force the diaphragm upward, raising the plunger, lifting the valve 1 from its seat, and opening the line of flow through passage 7. A spring 17 is arranged to oppose this tendency of the pressure in chamber 11 to lift the valve. The spring is compressed between a follower block 18 (arranged in the upper end of a spring housing 50) and washer 13 upon the upper surface of the diaphragm. The tension of the spring, effective on the top of the diaphragm, tends to hold the valve 1 to its seat, while the fluid-pressure in chamber 11, effective on the bottom of the diaphragm, tends to lift the valve from its seat.

In service it is desirable that flow through the passage 7 shall be controlled in accordance with pressure conditions in the body of fluid with which the diaphragm chamber 11 stands in open communication. In some cases it is desirable that the passage 7 shall remain closed to flow and shall be opened to flow only in the event that the pressure of such body of fluid rises above a predetermined critical value. In other cases it is desirable that the passage 7 shall be closed as long as the pressure of the body of fluid is greater than a given value. To this end the tension of the spring is minutely adjustable, as by means of a hand-screw 19. By adjusting spring tension to proper value, the valve may be held to its seat, with passage 7 closed, so long as the pressure in chamber 11 remains below a predetermined critical value. Upon rising above such critical value, the total pressure on the bottom of the diaphragm exceeds the power of the spring, and the plunger rises. The valve is lifted from its seat, and the passage 7 is opened to flow. The passage remains open so long as the pressure in chamber 11 exceeds said critical value.

Alternately, it may be desirable that the passage 7 shall be closed so long as the valve-governing pressure is above a given value, and be opened only when the pressure falls below such value. To meet such requirement the structure is modified in the particulars illustrated in Fig. II. The valve 1a is secured on plunger rod 2a below the seat 6a, and the pressure prevailing in the diaphragm chamber tends to hold the valve in closed position against the tension of spring 17a. The spring tension is established at such value that the pressure of the fluid in chamber 11a dominates the force of ths pring and normally holds the valve to its seat. The valve opens only when the fluid pressure in chamber 11a falls below the critical value. And the valve remains in open position until the pressure in the diaphragm chamber rises above such value. It will be perceived, therefore, that flow through passage 7 may be automatically controlled and regulated in accordance with variations from critical value in pressure of the body of fluid that is piped to the diaphragm chamber of the valve structure.

The invention consists in the organization, with an automatic valve of the sort described, of means for neutralizing the effect upon the movable valve parts of the pressure of the fluid in passage 7, to the end that the valve shall be more accurately responsive in operation to the difference in pressure between spring tension and fluid pressure effective upon the diaphragm 10. Such means consist in two pistons 20 and 21, spaced apart on the plunger and arranged, one below the valve and the inlet port 8 of passage 7, and the other above the valve and the outlet port 9 of such passage. The two pistons 20 and 21, lying outward from (above and below) the region in cylinder 3, 4 into which the ports 8 and 9 open, are equally exposed to the pressure of the fliud in passage 7 when the valve is open. And such pressure, equally effective above and below the valve, neither opposes nor assists the valve in its movement to and from position on seat 6. The valve in its said movement is so far as practically possible responsive solely to the difference between the pressure of the spring on one side of the diaphragm and the pressure of fluid in chamber 11 on opposite side, in this connection it being noted that, through the provision of a vent 50a in the spring housing, the upper surface of the diaphragm is open to the outer atmosphere.

Advantageously, the pistons 20, 21 consist in cup-shaped washers of leather or the like, clamped between suitable members 22, 23 and 24, 25 on the plunger 2. Such pistons are arranged with their cupped sides or faces directed towards the valve 1. And it may further be remarked that the valve-seat 6 is of smaller diameter than the pistons 20 and 21, as shown in the drawing.

The arrangement of the cup-pistons 20a and 21a in the structure of Fig. II is substantially identical with the pressure-neutralizing or equalizing pistons 20 and 21 of Fig. I, with the following qualification: In the structure of Fig. II the cylinder portion 3a may be made slightly smaller in diameter than cylinder portion 4a, in which event the piston 20a will, other things being equal, be of smaller effective area than piston 21a.

In both structures described, the cylinder (3, 4 or 3a, 4a) opens into the diaphragm chamber, to permit the connection of the plunger to the diaphragm. In one of these two structures—the structure shown in Fig. I, in which it is an augmented pressure in chamber 11 that moves the valve into open position—I advantageously provide a third cup-piston. This third piston, 26, is arranged with its cupped side facing the diaphragm, and operates to prevent the high pressures which might develop in chamber 11 from producing leakage past the piston 20 and impairing the otherwise perfect operation of the valve structure.

As an example of the many mechanical devices and machines in which the above-described valve is serviceable, I mention pressure-reducing valves, and note particularly the pressure-reducing valve illustrated and described in my co-pending application Serial No. 224,899, filed on the 15th day of August, 1938. In such pressure-reducing valve, the structure shown in Fig. II of the drawing in this case is embodied.

I claim as my invention:

1. In a valve structure including two body portions assembled upon the opposite sides of a flexible diaphragm and sealing the periphery of the diagram between them, the body portion on one side of the diaphragm including a cylinder axially aligned with the center of the diaphragm and provided with a valve seat intermediate its two ends, a passage for fluid extending through said body portion, said passage including an inlet portion opening immediately into said cylinder on one side of said seat and an outlet portion opening from said cylinder on opposite side of said seat, a plunger in said cylinder carrying a valve adapted to make contact with said seat, said plunger extending axially from said cylinder and being secured and sealed to the center of said diaphragm, an inlet for the admission of fluid under pressure to the flexible diaphragm on the plunger side thereof, and a spring arranged to exert pressure on opposite side of said diaphragm, with such side of the diaphragm open to normal atmospheric pressure; the improvements in structural organization herein described that consist in two pistons mounted upon the body of the plunger that extends from the fluid-pressure side of said flexible diaphragm; one piston being spaced from one side of said valve and being arranged in said cylinder to one side of said valve-seat and the point at which the inlet portion of said passage opens into the cylinder, with the effect that (when the valve is in seated position) said piston is exposed to the pressure of fluid in said inlet portion of the passage; and the other of said pistons being spaced from the opposite side of said valve and being arranged in said cylinder to the opposite side of said valve seat and the point at which the outlet portion of said passage opens from the cylinder, with the effect that (when the valve is in seated position) said last piston is exposed to the pressure of fluid in said outlet portion of the passage; both of said pistons being exposed (when said valve is unseated) to the pressure of fluid in the communicating inlet and outlet portions of said passage, whereby said plunger is responsive substantially solely to the difference between fluid pressure and spring pressure acting on said diaphragm.

2. The structure according to claim 1, in which said pistons comprise cup-washers arranged with their cupped sides facing said valve, and a third cup-washer mounted on said plunger at a point between said valve and said diaphragm, said third cup-washer being arranged in said cylinder with its cupped side facing said diaphragm.

THOR GANNESTAD.